March 30, 1954  M. W. ZÜBLIN  2,673,464
DEVICE FOR INDICATING THE MAXIMUM
VALUE OF A VARIABLE FORCE
Filed Aug. 13, 1949  2 Sheets-Sheet 1
Fig. 1
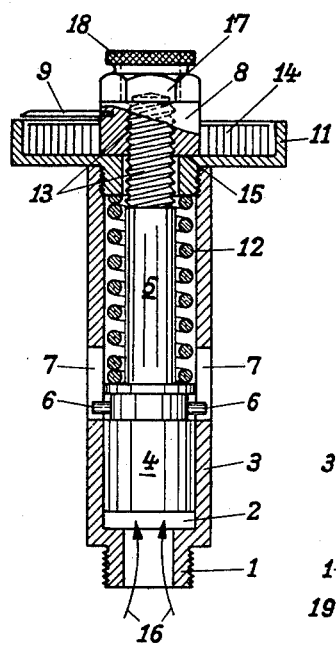
Fig. 4
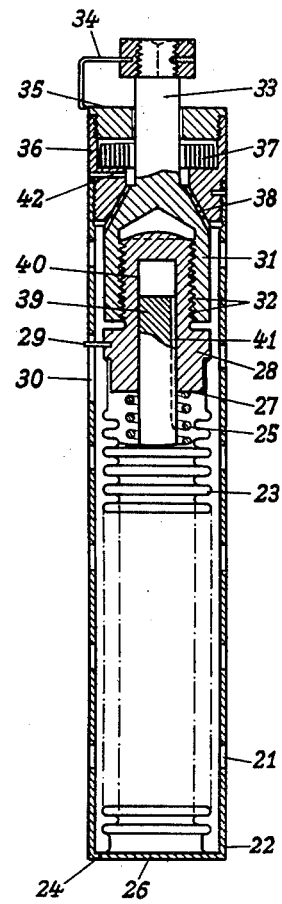
Fig. 3
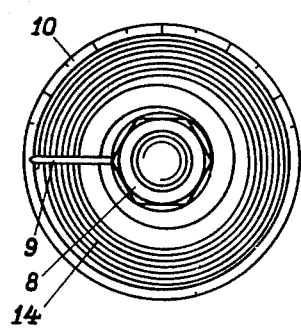
Fig. 2
Fig. 6
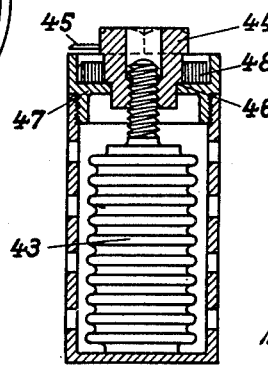
Fig. 5
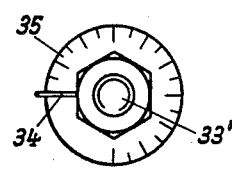
INVENTOR:
MARCEL WILHELM ZÜBLIN.
BY K. A. Mayr.
ATTORNEY March 30, 1954  M. W. ZÜBLIN  2,673,464
DEVICE FOR INDICATING THE MAXIMUM
VALUE OF A VARIABLE FORCE
Filed Aug. 13, 1949  2 Sheets-Sheet 2

INVENTOR.
MARCEL WILHELM ZÜBLIN
BY K. A. Mayr
ATTORNEY

Patented Mar. 30, 1954

2,673,464

UNITED STATES PATENT OFFICE 2,673,464

DEVICE FOR INDICATING THE MAXIMUM VALUE OF A VARIABLE FORCE

Marcel Wilhelm Züblin, Dumbarton, Scotland, assignor to Sulzer Freres, Societe Anonyme, Winterthur, Switzerland, a corporation of Switzerland Application August 13, 1949, Serial No. 110,206

Claims priority, application Switzerland October 28, 1948

3 Claims. (Cl. 73—141)

The invention relates to devices for indicating the maximum of a variable force, of the kind in which the magnitude of the force is measured by the extent of axial displacement of a member responsive to the force to be measured which is counterbalanced by a spring. The maximum displacement is indicated by an indicating element which remains in the position corresponding to the maximum force acting on said member.

According to the present invention, in a device of the kind specified for indicating the maximum value of a variable force, the displacement of the aforesaid member or measuring element is transmitted through a self-locking screw mechanism to the indicating element, and the latter is urged by an auxiliary force in the direction for indicating an increased force but is locked against such movement at all times when the value of the variable force is below a previous maximum value.

The device according to the invention is so constructed as to be insensitive to and prevented from coming into resonance with any super-imposed vibration. Such vibration cannot cause the indicating element to give a false indication beyond the actual maximum value of the applied force, as might occur if the measuring element were at all times free to vibrate.

The device may include a pair of co-operating screw-threaded members, one associated with the measuring element and the other with the indicating element, a seat abutted by one of these screw-threaded members to prevent relative rotational movement and arranged so that axial displacement of the measuring element due to an increase of the applied force beyond a previous maximum value eases the contact pressure between the seat and the abutting screw-threaded member, and a follow-up actuating means or spring tending to produce relative rotation between the screw-threaded members in such direction as to restore the contact pressure between the seat and the abutting screw-threaded member.

The seat and the corresponding surface of the abutting screw-threaded member may both be of conical form and either or both surfaces may be grooved. Preferably the seat and the corresponding surface of the abutting screw-threaded member are of different hardnesses, which may be achieved either by making them of different materials or, where the same materials are employed, by giving different heat treatments to the two engaging surfaces.

In another modification of the invention intended more particularly for measuring the maximum value of a force with rapid periodic variations, the device is provided with an additional locking means or seat which comes into action to prevent relative rotation of the two members of the screw mechanism should the displacement of the measuring element exceed the corresponding deflection of the indicating element by a predetermined amount. In this way, the deflection of the two elements per period can increase by only a small amount, and thus can move only in a series of progressive steps towards the periodic maximum value to be indicated. Thereby excessive accumulations of kinetic energy in the elements are avoided, which accumulations could cause a false indication exceeding the actual maximum value of the applied force.

Further and other objects of the present invention will be hereinafter set forth in the accompanying specification and claims and shown in the drawings, which by way of illustration show what I now consider to be preferred embodiments of the invention.

Figure 1 is a sectional elevation of a device according to the invention for indicating the maximum value of a variable pressure.

Figure 2 is a plan of the device shown in Figure 1.

Figure 3 shows a modification of the device shown in Figure 1, by which it can be used to indicate the maximum value of a force.

Figure 4 is a sectional elevation of a device according to the invention for indicating the positive maximum value of the pressure of a fluid.

Figure 5 is a plan of the device shown in Figure 4.

Figure 6 is a sectional elevation of a device according to the invention for indicating the negative maximum value of the pressure of a fluid.

Figure 7:
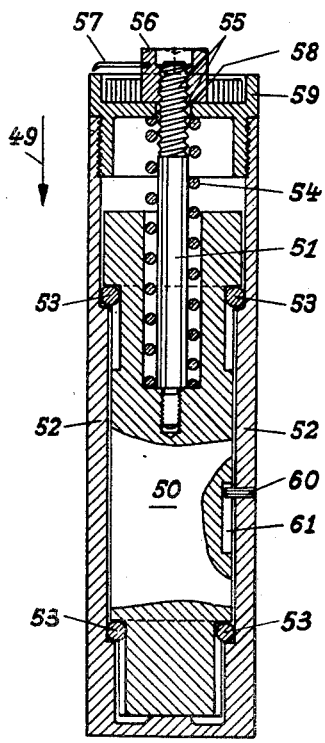
Figure 7 is a sectional elevation of a device according to the invention for indicating the maximum value of an acceleration.

The device shown in Figures 1 and 2 is tightly fastened by means of a threaded boss 1 to a vessel, not shown, in which there is a variable pressure, so that the interior 2 of a cylinder or casing 3 communicates with the interior of the vessel. The variable pressure acts on a piston 4 and is thereby converted into a force. The measuring means consists of the piston 4 and a threaded rod 5 secured to it. It is prevented from rotating about its longitudinal axis by two pins 6, which slide along grooves 7 in the walls of the cylinder 3. The indicating element consists of a nut 8 and a pointer 9 secured thereto, the latter being movable over a scale 10 attached to a flange 11 which is secured to the cylinder 3. The measuring element 4, 5 is counter-balanced by a spring 12, which at one end bears against the piston 4 and at the other end bears against a shoulder inside cylinder 3. The indicating element 8, 9 is connected to the measuring element 4, 5 through a screw mechanism consisting of the threaded end 13 of the rod 5, and the nut 8, and is actuated by a follow-up spring 14 which tends to move it over the scale 10 in the direction of an increased scale reading. This follow-up spring is in the form of a spiral spring, whose outer end is secured to the flange 11 and whose inner end is secured to the nut 8 of the indicating element. The spring 14 tends to screw the nut 8 down on the thread 13.

Before the measuring begins, the magnitude of the variable force acting on the measuring element 4, 5 is zero. The measuring spring 12 is under a slight initial compression which holds the nut 8 with its underside 15 in contact with a seat on the flange 11, thereby braking rotation of the indicating element. The nut 8 is set with the pointer 9 in the zero position of the scale 10, and is held in this position despite the tension of the auxiliary spring 14, by virtue of the friction between its underside 15 and the seat. In this condition, in which the nut is prevented from rotating, it and the parts connected to it are said to be locked. Now, if the variable force indicated by the arrows 16 begins to act, it presses on piston 4 and raises it slightly, relieving the underside 15 of the nut 8 from the seat and thereby allowing the nut to turn on the thread 13. Thus the follow-up spring 14 is able to rotate the indicating element 8, 9 in a direction corresponding to an increased indication, and will continue to do this as long as the variable pressure is increasing.

When the variable pressure has reached its maximum and begins to drop, the underside 15 of the nut 8 is again pressed firmly into contact with the seat, locking it again but this time with the pointer 9 indicating the maximum value of the force 16.

Before re-using the device, it must be re-set. For this purpose, the nut 8 is provided with a hexagon 17 and a knurled knob 18, which makes it possible to turn back the indicating element 8 and 9 by a spanner or by hand until the pointer 9 is in zero position.

The provision of such setting means has also proved to be of value when the pressure to be indicated varies rapidly. When the pressure rises suddenly, the indicating element 8, 9 (of which the rotational acceleration is determined only by the tension of the follow-up spring 14) may not be able to follow the great longitudinal acceleration of the measuring element 4, 5 caused by the sudden rise of pressure, so that the nut 8 is temporarily lifted clear of the seat instead of its contact pressure merely being eased. Moreover, owing to the kinetic energy acquired by the measuring element 4, 5 during the sudden rise of pressure, this element may be moved far beyond the position corresponding to the actual maximum value of the pressure. These effects can cause the pointer 9 to indicate on the scale 10 a value for the maximum pressure which is far greater than its actual maximum. If this is suspected, the indicating element may be turned back by hand a certain amount so that it must measure the maximum value again. This process can be repeated until a setting is attained from which the indicating element is deflected only slightly by the pressure maximum, in which case the necessary rotational acceleration of the indicating element 8, 9 and the kinetic energy acquired by the measuring element 4, 5 are so small that they can no longer falsify the indication.

As shown in Figure 3, a stud 19 may be mounted on the piston 4 of the measuring element, if necessary in a detachable manner, which stud protrudes downwards beyond the threaded boss 1 and permits a variable force to act directly on the measuring element 4, 5 as shown by the arrow 20.

The device shown in Figures 4 and 5 is designed for the purpose of indicating the maximum positive value of the pressure of a fluid surrounding the device. The pressure of this fluid acts through apertures 21 in the casing 22 on a sealed bellows 23 which is secured at one end 24 to the casing 22. If desired, the interior of the bellows can be evacuated. The bellows 23 encloses a spring 25, which is supported between abutments 26 and 27. The abutment 27 is integral with a member 28 which carries a thread 32 and which acts as the measuring element. A pin 29 sliding in a longitudinal slot 30 in the casing 22 prevents the measuring element from rotating about its axis. The other member of the screw mechanism acts as the indicating element and is in the form of a nut 31. The nut 31 carries a stem 33 on which is mounted a pointer 34. The deflection of the pointer is measured on a scale 35, which is located on a member 36 secured to the casing 22. The indicating element 31, 33 is urged by a follow-up spring 37 in the direction of an increased deflection. This follow-up spring is a spiral spring and is secured at its outer end to the member 36 and at its inner end to the nut 31. The nut 31 is axially supported on a conical seat 38 formed in the member 36.

A spigot 39 is mounted on the base 26 of the bellows 23, and the member 28 can slide on the spigot 39, which projects into a bore 40 therein. If the bellows contains a fluid, a passage 41 is provided through which the fluid can pass to and from the free space in the bore 40. The size of the passage is such that a braking effect is produced as by a dash-pot. Since this braking effect disappears after a certain length of time according to the size of the passage, falsification of the measurement by mass effects can be prevented, particularly where periodically fluctuating pressures are to be measured.

The pressure of the fluid on the outside of the bellows 23 is counterbalanced by the spring 25. Should the pressure exerted by the spring 25 and tending to expand the bellows be greater than that exerted by the surrounding fluid tending to compress it, there will be an axial expansion of the bellows which acts on the conical seat 38 through the nut 31 and the thread 32. The follow-up spring 37 is initially tensioned to increase the scale reading of the indicating element. For this purpose, the indicating element 31, 33 is turned back towards its zero position. In the pre-tensioned state, the device is in a condition to determine the periodic peak pressure of the fluid, which may be, for example, the cooling water for a piston of an internal combustion engine. At every pressure rise, a compressive force acts on the bellows 23 and decreases to a low value the reaction exerted through the conical seat 38 by the spring 25. Upon the substantial disappearance of the reaction exerted through the conical seat, the follow-up spring 37 will rotate the indicating element 31, 33 so as to increase the scale reading. At each periodic pressure increase, the pointer will move further over the scale until equilibrium is reached between the maximum value of the periodically changing pressure on the bellows 23, the force of the spring 25, and the reaction exerted through the conical seat 38. In this condition, the pressure of the fluid acting on the bellows 23 can no longer prevent the locking of the mechanism by friction on the conical seat 38, so that no further movement of the pointer can occur. The device can now be removed from the space containing the fluid, and the maximum pressure which occurred during the measuring period can be read directly from the scale 36. If the device is to be re-used, the follow-up spring 37 must be tensioned again to relieve the spring 25 in the interior of the bellows.

Due to the conical seat 38, to which a lubricant can be supplied through a passage 42, the perpendicular separation of the surfaces of the nut 31 and the conical seat 38 amounts only to a fraction of the relative axial movement. Thus the oil layer between these two surfaces is prevented from becoming detached, so that during the whole lifting an effective damping of the indicating element is obtained. This damping effect can be amplified by providing grooves in one or both of the seat surfaces. This arrangement largely eliminates the danger that an indication of a pressure above the real maximum might be given owing to accumulated kinetic energy in the moving parts.

A further advantage of the construction described resides in the fact that a large area of contact is provided between the nut 31 and the seat by virtue of the conical form of the cooperating surfaces, whereby the locking of the mechanism is improved.

The angle of the conical seat will depend on the rapidity and the amplitude of the periodical variations in the variable pressure to be measured.

This form of the device is useful for indicating the maximum of pressure in spaces of an engine which are inaccessible during operation. It permits, for example, the determination of the maximum pressure which occurs in the cooling space of a piston of an internal combustion engine due to "hydraulic knock." For this purpose, the device shown in Figure 4 may be inserted in the cooling space before the engine is started and withdrawn and read after the engine has been stopped. If there is any suspicion that the indication shown exceeds the actual maximum because the pressure increased too sharply, the indicating element 31, 33 is adjusted by means of a hexagon nut 33' to an indication somewhat lower than that previously indicated. If, on repeating the test, no change from the adjusted value of the indication results, this process is repeated successively until a small increase over the adjusted indication occurs. In this way, the actual value of the maximum pressure can be determined with great reliability.

Figure 6 shows a similar device, but modified for the indication of the negative maximum value of the pressure of the surrounding fluid, that is for the indication of the lowest value of a subatmospheric pressure. In contradistinction to the device shown in Figures 4 and 5, the subatmospheric pressure lengthens the bellows 43, and for this reason the indicating element 44, 45 with its surface 46 is not supported from the inside of the casing, but from the outside on a seat on a flange 47, and also the follow-up spring 48 is arranged outside the casing.

The device shown in Figure 7 is designed for the purpose of indicating the maximum acceleration or deceleration of a vehicle, into which the device is rigidly incorporated. If the device is to be used to measure an acceleration in the direction of the arrow 49, this acceleration is converted into a force by means of the mass 50, and this force acts on a measuring element consisting of the mass 50 and a rod 51. For the purpose of decreasing its friction in the casing 52, the measuring element is mounted on ball bearings 53. It is under the influence of a measuring spring 54, and the upper end of the rod 51 forms part of the screw mechanism 55. The indicating element 56, 57 is supported on the outside of the jacket 59 by means of a seat 58. A pin 60, which is fixed to the casing 52 and engages freely but without undue play in a groove 61 of the measuring element, prevents the measuring element from rotating about its axis during the measuring while permitting it to move axially.

The same device can also be used for indicating the maximum retardation of a vehicle, by installing it in the vehicle invertedly, i. e. so that the arrow 49 points in the opposite direction to that in which the vehicle is moving.

Figure 9:
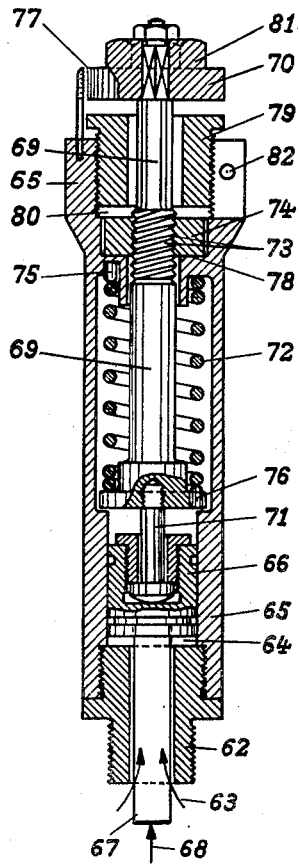
Figure 9 is a sectional elevation of a device according to the invention for indicating the maximum value of a pressure, intended for use more especially where the pressure is subject to rapid periodic variations.
Figure 8:
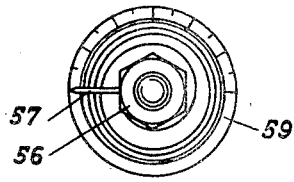
Figure 8 is a plan of the device shown in Figure 7.
Figure 10:
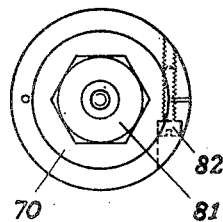
Figure 10 is a plan of the device shown in Figure 9.

The device shown in Figures 9 and 10 is designed in a similar manner to that shown in Figures 1 and 2, to indicate the maximum value of a variable pressure. As in the case of the device shown in Figures 1 and 2, it is tightly fixed, by means of a threaded boss 62, to a vessel not shown, in which the variable pressure occurs. This variable pressure, as indicated by the arrows 63, reaches the space 64 of a cylinder 65 and is used for moving a piston 66. As in Figure 3, a stud 67 may be fastened to the piston 66, if desired in a detachable manner, which permits a variable force to act directly on the piston 66 and thus to render the device suitable also for indicating such a force as is indicated by the arrow 68. The piston 66 is connected by means of a bolt 71 to an indicating element consisting of a spindle 69 carrying a member 70 provided with a scale 77. The bolt 71 is firmly screwed into the spindle 69 and is fastened in the piston 66 in such a way that it connects the piston 66 to the indicating element 69, 70 so that they are capable of relative rotation. The piston 66 is loaded by a spring 72, the force of which is transmitted to the piston by means of a collar on the foot of the spindle 69 and the bolt 71. The screw mechanism consists of a thread cut on the spindle 69, and a nut 74 which is longitudinally movable but non-rotatable in the cylinder 65. To this end, the nut may, for example, be formed on the outside as a hexagon, not shown, which corresponds to a hexagonal recess in the cylinder 65. The auxiliary force, which tends to rotate the indicating element in the direction of an increased deflection, is in this modification obtained from the measuring spring itself. This is effected by imparting a twist to the spring so as to pre-tension it. The ends of the spring wire are bent out of the plane of the end coils and are inserted respectively into a bore 75 in the cylinder casing and a bore 76 in the foot of the spindle 69. In order to increase the torsional tension of the spring without affecting its longitudinal elasticity, the spring may be wound from flat steel instead of round steel as shown in the drawing. Now, if the variable force acting on the measuring element 66 increases, it eases the nut 74 from the casing 65 and allows the pre-tensioned spring 72 to untwist a little so that it rotates the indicating element 69, 70 about its axis in the direction of an increased deflection. The indicating element in this case participates in the longitudinal movement of the measuring element 66, but at the same time turns, which latter movement appears on the scale as the indicated deflection. If the variable force decreases after reaching the maximum, the nut 74 is again locked and prevents movement of the indicating element. If the variable force rises very sharply, the rotational movement of the indicating element 69, 70 may no longer follow the greatly accelerated longitudinal movement of the measuring element 66, whereby the nut 74 is lifted clear of its seat in the cylinder 65, in which case the indicator, in a manner similar to that previously described with reference to Figures 1 and 2, can give a false reading for the maximum value of the force, which reading is greater than the actual maximum. As with the device shown in Figures 1 and 2, such a false reading can be remedied by the repetition of the measurement as already described. In this particular device, however, additional means are provided in order to make it suitable for indicating the periodically recurring maximum value of a rapidly variable periodic force. These means comprise an adjustable limiting stop member 79, by means of which the longitudinal clearance 80 for the nut 74 can be adjusted by hand. The extent of this clearance determines the amount by which the measuring deflection can exceed the indicated deflection. By this means, in the case of a steep pressure rise, the nut 74 after being lifted from its seat 78, which is an internal shoulder on the casing means, and passing through the clearance 80 abuts the stop member 79, which locks it and the indicator against further rotation in the direction of an increased deflection. Thus the indicating deflection can be increased only by a small amount per period of the variable force, and so moves only step by step toward the periodically recurring maximum value to be indicated. Harmfully great amounts of kinetic energy, which would move the indicator beyond the actual maximum value, thus cannot accumulate in the two elements. A repetition of the measurement, as described in the case of Figures 1 and 2, is therefore superfluous. It is only necessary to adjust the instrument before it is used, by means of a hexagonal nut 81, to a pressure value which is greater than the expected minimum of the variable pressure to be measured. The upper portion of the casing 65 is axially slotted and a screw 82 serves for clamping the adjustable limiting stop member 79 in the desired position.

The modifications described may, of course, be varied considerably without departing from the scope of the invention. Thus on the basis of the explanations given in the case of Figures 4 to 6, the devices shown in Figures 1 and 9 designed for the indication of the positive maximum value of a variable pressure may be modified for the indication of the negative maximum value of a variable pressure.

While I believe the above described embodiments of my invention to be preferred embodiments, I wish it to be understood that I do not desire to be limited to the exact details of method, design and construction shown and described, for obvious modifications will occur to a person skilled in the art.

I claim:

1. A device for indicating the maximum value of a variable force, comprising a longitudinal casing having a surface portion, a force receiving member longitudinally movable within said casing and adapted to be actuated and moved by the force to be measured, resilient means connected with said casing and with said receiving member for resisting movement of the latter by said force, said receiving member comprising a threaded part, a nut member screwed to said threaded part, prestressed resilient means connected with one of said members and with said casing for automatically rotating said members relatively to each other, said nut member normally resting on and being pressed against said surface portion by the action of said resilient means for frictionally preventing relative rotation of said nut member and of said threaded part, said nut member being lifted from said surface portion and affording relative rotation of said nut member and of said threaded part by said prestressed resilient means when the force to be measured overcomes the resistance of said resilient means, and indicating means connected with the member to which said rotating means are connected for indicating the extent of relative rotation of said last mentioned member and of said threaded part.

2. A device for indicating the maximum value of a variable force, comprising a longitudinal casing having a surface portion, force receiving means including resilient means and having a portion longitudinally movable in said casing and adapted to be actuated and moved by the force to be measured against the action of said resilient means, said receiving means comprising a threaded part, a nut member screwed to said threaded part, a spiral spring having one end connected with said nut member and the other end connected with said casing and tending to rotate said nut member along said threaded part toward said surface portion, means preventing rotation of said receiving means, said nut member normally resting on and being pressed against said surface portion by said resilient means for preventing rotation of said nut member by said spiral spring and being lifted from said surface portion to be rotated by said spiral spring when the force to be measured overcomes the resistance afforded by said resilient means, and indicating means connected with said nut member for indicating the extent of rotation thereof by said spiral spring.

3. A device for indicating the maximum value of a variable force, comprising a cylindrical casing having an outside surface portion, force receiving means axially movable within said casing and adapted to be actuated and moved by the force to be measured, a coil spring placed inside said casing and interposed between the latter and said member for resisting movement of the latter by said force, said receiving means comprising a rod axially extending through said coil spring and having a threaded end extending outside of said casing, a nut member screwed to said threaded end, a spiral spring having one end connected with said nut member and the other end connected with said casing and tending to rotate said nut member along said threaded part toward said surface portion, means preventing rotation of said receiving means in said casing, said nut member normally resting on and being pressed against said surface portion by the action of said resilient means for preventing rotation of said nut member by said spiral spring and being lifted from said surface portion to be rotated by said spiral spring when the force to be measured overcomes the resistance afforded by said coil spring, and indicating means connected with said nut member for indicating the extent of rotation thereof by said spiral spring.

MARCEL WILHELM ZÜBLIN.

References Cited in the file of this patent

UNITED STATES PATENTS

| Number | Name | Date |
|---|---|---|
| 1,091,128 | Guillery | Mar. 24, 1914 |
| 1,263,165 | Vincent | Apr. 16, 1918 |
| 1,421,774 | Harder | July 4, 1922 |
| 1,451,224 | Johns | Apr. 10, 1923 |
| 1,859,045 | Monckmeier | May 17, 1932 |
| 2,130,649 | Okill | Sept. 20, 1938 |
| 2,271,268 | Longstreet | Jan. 27, 1942 |

FOREIGN PATENTS

| Number | Country | Date |
|---|---|---|
| 358,422 | France | Dec. 18, 1905 |
| 215,477 | Great Britain | May 15, 1924 |